Patented May 6, 1930

1,757,944

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

METHOD OF VULCANIZING CAOUTCHOUC

No Drawing.   Application filed September 17, 1925.   Serial No. 57,021.

My invention relates to the vulcanization of caoutchouc and it is particularly related to a new method of accelerating the same.

The object of the present invention is to provide a class of accelerators which are capable of imparting improved qualities to the vulcanized product.

Subsequent to the introduction of aniline as an accelerator of vulcanization, a large number of materials have been prepared and tried in an effort to reduce the time necessary for vulcanization. It is now appreciated, however, that the best properties of the vulcanizate are not always secured by utilizing the most rapid accelerator and that other factors must be considered before selecting this ingredient for a rubber mix. Among these considerations, and in addition to the time factor are the relative activity of the material while the mix is being manipulated, commonly referred to as "scorching," together with the physical properties of the ultimate product, such as the tensile strength, elongation and age-resisting qualities.

At the present time the last mentioned property is receiving careful consideration. Various investigations indicate that the age-resisting properties of a vulcanized product, that is, its ability to retain its original elasticity and tensile strength, are closely related and perhaps dependent in part on its ability to withstand the oxidizing effect of the atmosphere. Whether or not this property is improved by the presence of certain products that result in the vulcanization of the rubber or to the presence of the accelerator or their decomposition product is not clearly understood. Nevertheless it is well appreciated that a change in the accelerating body of a rubber mix produces a marked effect on the aging properties of the vulcanized product.

It has been noted that polyhydroxy aryl compounds, such, for example, as hydroquinone and pyrogallol, are capable reducing agents. It is also well-known that the hydroxy group will react with amino bodies. I have found that the reaction products of these materials are valuable accelerators and at the same time impart the necessary age-resisting properties which are essential in producing a satisfactory rubber composition. In fact, I have found that in some cases the resulting caoutchouc product improves with age. The following materials will serve as examples to illustrate typical procedures in preparing the accelerator along with the results of physical tests when the material is incorporated in a rubber mix. The age-resisting properties were determined by subjecting the test samples to a seven day oven treatment and subsequently determining their breaking strength. This is expressed as a percent of the tensile strength of the unexposed product.

Two mols of xylidine and one of hydroquinone are caused to react in a benzene solution. A grey colored crystalline product is formed, whose melting point is 95° C. In much the same way one mol of amylamine may be caused to react with one of hydroquinone in an alcoholic solution to give a red crystalline product which melts at 148° C.

It is believed that in some instances, the reaction products are oxydized due to their being exposed to the atmospheric oxidizing agents. In many cases, however, it has been found that the valuable properties are not impaired and in some instances they are even enhanced. The above preparations, together with a large number of others, were compounded in the following formula, and compared with the amine from which they were prepared:

100 parts rubber.
5 parts zinc oxide.
6 parts sulfur.
.5 parts accelerator.

| Accelerator | Time of cure at 40-pound steam pressure | Original tensile strength kgs/cm² | Per cent of original tensile after 7 days aging |
|---|---|---|---|
| Xylidine | 1.40 | 112 | 87 |
| Xylidine+hydroquinone | 1.40 | 105 | 103 |
| Isoamylamine | .40 | 138 | 81 |
| Isoamylamine+hydroquinone | 1.30 | 116 | 97 |
| Dibenzylamine | 1.30 | 100 | 82 |
| Dibenzylamine+hydroquinone | 1.40 | 95 | 98 |
| Di-n-propylamine | 1.00 | 122 | 87 |
| Di-n-propylamine+hydroquinone | 1.10 | 107 | 87 |
| Tributylamine+hydroquinone | 1.40 | 108 | 102 |
| Bisamylamino+hydroquinone | .30 | 123 | 101 |

As indicated above some of the reaction products, particularly of the hydroquinone series, are somewhat unstable. For example, the paradiamino compounds of hydroquinone are stable only in the dry state and, if exposed to air or moisture, they form colored compounds probably containing a chromophore grouping and appear to be quinone derivatives, which may be characterized by the following structure:

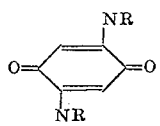

A specific example of this compound which is both an accelerator or vulcanization as well as anti-ozident, is bis (amylamino) quinone. In order to prepare this compound, the reacting ingredients are dissolved in alcohol, which is subsequently maintained at its boiling point for approximately 30 minutes. The solvent is then removed by evaporation. The reduced form of the quinone which probably has the formula:

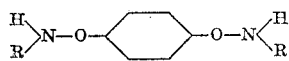

may be prepared conveniently in a non-aqueous solvent.

In view of the several examples given above, it will be appreciated that the invention may be subjected to a wide number of variations. Thus, instead of using parahydroxybenzene, other hydroxyaryl compounds which are known to be reducing agents, may be substituted. In like manner, other amines may be employed. Moreover, it is to be understood that the invention contemplates the utilization of any primary or secondary amines of alkyl, aryl, or heterocyclic specie, together with and including ammonia. It is likewise to be understood that the invention is not limited to accelerating bodies which have been prepared at any temperature, or in a medium, having a specific hydrogen ion concentration inasmuch as the preparation of materials may be effected in any suitable medium of any ion concentration. It will be apparent, therefore, that the invention should not be limited except as indicated by the appended claims.

What I claim is:

1. The method of accelerating the vulcanization of caoutchouc which comprises vulcanizing the same in the presence of an amylamine hydroquinone reaction product.

2. The method of accelerating the vulcanization of caoutchouc which comprises vulcanizing the same in the presence of bisamylamino quinone.

3. The method of accelerating the vulcanization of caoutchouc which comprises vulcanizing the same in the presence of the reaction product of two mols of amylamine and one mol of hydroquinone.

4. A caoutchouc product which has been vulcanized in the presence of bisamylamino quinone.

5. A caoutchouc product which has been vulcanized in the presence of the reaction product of two mols of amylamine and one mol of hydroquinone.

6. A rubber product that has been subjected to vulcanization in the presence of a reaction product of a poly-hydroxy benzene and an aliphatic amine containing at least five carbon atoms.

7. A rubber product that has been subjected to vulcanization in the presence of a reaction product of a dihydroxy benzene and an aliphatic amine containing at least five carbon atoms.

8. A rubber product that has been subjected to vulcanization in the presence of a reaction product of hydroquinone and an aliphatic amine containing at least five carbon atoms.

9. A rubber product that has been vulcanized in the presence of a reaction product of a poly-hydroxy-benzene and an aliphatic derivative of ammonia in which the aliphatic group contains at least five carbon atoms.

10. A method of treating rubber which comprises subjecting it to vulcanization in the presence of a reaction product of hydroquinone and a material selected from a group comprising isoamylamine, bis-amylamine, dibenzylamine and secondary aliphatic amines containing at least five carbon atoms.

11. A method of treating rubber which comprises subjecting it to vulcanization in the presence of a reaction product of hydroquinone and a material selected from a group comprising isoamylamine, xylidine, dibenzylamine, dipropylamine, tri-butylamine and bis-amylamine.

12. A method of treating rubber which comprises subjecting it to vulcanization in the presence of a reaction product of hydroquinone and a material selected from a group comprising primary aliphatic amines, dibenzylamine, secondary aliphatic amines, containing at least five carbon atoms, tertiary, amines containing more than six carbon atoms, xylidine and bis-amylamine.

In witness whereof, I have hereunto signed my name.

LORIN B. SEBRELL.